United States Patent

Endo et al.

(10) Patent No.: US 6,736,753 B2
(45) Date of Patent: May 18, 2004

(54) VEHICLE DRIVE CONTROL APPARATUS AND METHOD

(75) Inventors: Hiroatsu Endo, Toyota (JP); Tatsuya Ozeki, Nissin (JP); Kazumi Hoshiya, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 56 days.

(21) Appl. No.: 10/124,280

(22) Filed: Apr. 18, 2002

(65) Prior Publication Data

US 2002/0173391 A1 Nov. 21, 2002

(30) Foreign Application Priority Data

May 18, 2001 (JP) ........................................ 2001-148891

(51) Int. Cl.[7] .................................................. B60K 1/00
(52) U.S. Cl. ............................................. 477/3; 477/45
(58) Field of Search ........................ 474/28, 69; 477/3, 477/45, 46

(56) References Cited

U.S. PATENT DOCUMENTS

| | | | | |
|---|---|---|---|---|
| 5,846,155 A | * | 12/1998 | Taniguchi et al. | 477/2 |
| 6,083,139 A | * | 7/2000 | Deguchi et al. | 477/5 |
| 6,110,062 A | * | 8/2000 | Fujikawa | 474/28 |
| 6,336,888 B1 | * | 1/2002 | Eguchi | 477/3 |
| 6,379,282 B1 | * | 4/2002 | Aoki | 477/109 |
| 6,508,735 B1 | * | 1/2003 | Murakami et al. | 477/46 |
| 6,524,216 B2 | * | 2/2003 | Suzuki et al. | 477/3 |
| 6,524,217 B1 | * | 2/2003 | Murakami et al. | 180/65.3 |
| 2001/0008192 A1 | * | 7/2001 | Morisawa | 180/197 |

FOREIGN PATENT DOCUMENTS

| | | | |
|---|---|---|---|
| DE | 199 30 391 A1 | * | 1/2000 |
| DE | 100 04 401 A1 | * | 8/2000 |
| JP | B2 2661346 | | 6/1997 |
| JP | A 10-252881 | | 9/1998 |

* cited by examiner

Primary Examiner—David A. Bucci
Assistant Examiner—Bradley J. Van Pelt
(74) Attorney, Agent, or Firm—Oliff & Berridge, PLC

(57) ABSTRACT

Methods and apparatus for a vehicle drive control apparatus changes in the transfer torque capacity of a power transfer device according to various states of operation with respect to at least one drive power source. The vehicle drive control apparatus includes a power transfer device that has a variable transfer torque capacity and the drive power sources that rotate a drive wheel via the power transfer device. A controller is included that causes a vehicle to selectively run in a variety of run modes that differ in states of operation with respect to at least one of the drive power sources. The controller changes the transfer torque capacity of the power transfer device in accordance with the various run modes. According to the vehicle drive control apparatus, a target oil pressure is raised by a predetermined amount when the mode of run is change, or when the vehicle descends in a direction opposite to a vehicle starting direction at the time of a hill climb start.

11 Claims, 11 Drawing Sheets

FIG. 4

| POSITION | MODE | ENGAGINE ELEMENT | C1 | C2 | B1 |
|---|---|---|---|---|---|
| B,D | ETC RUN MODE | | × | ○ | × |
| | LOCKED-UP RUN MODE | | ○ | ○ | × |
| | MOTOR RUN MODE (FORWARD) | | ○ | × | × |
| N,P | NEUTRAL | | × | × | × |
| | CHARGE/ENGINE START MODE | | × | × | ○ |
| R | MOTOR RUN MODE (REVERSE) | | ○ | × | × |
| | FRICTION RUN MODE | | ○ | × | △ |

( ○ : ENGAGED
 △ : SLIP-ENGAGED
 × : RELEASED )

VEHICLE DRIVE CONTROL APPARATUS AND METHOD

INCORPORATION BY REFERENCE

The disclosure of Japanese Patent Application No. 2001-148891 filed on May 18, 2001 including the specification, drawings and abstract is incorporated herein by reference in its entirety.

BACKGROUND OF THE INVENTION

1. Field of Invention

The invention relates to vehicle drive control apparatus and method, and more particularly, to an improvement in a drive control apparatus of a vehicle capable of running in different running modes in which the states of operation of various drive power sources vary.

2. Description of Related Art

In known vehicles, drive wheels are rotated via a power transmission apparatus capable of changing the transfer torque capacity. For example, a vehicle, described in Japanese Patent Application Laid-Open No. 3-209050, has as a power transmission apparatus capable of changing the transfer torque capacity, a belt-type continuously variable transmission that transfers power by clamping a transmission belt via a hydraulic actuator, and shifts the transmission speed ratio by changing the groove width of a pair of variable pulleys. The belt-type continuously variable transmission is designed so that the transfer torque capacity can be adjusted by changing the pressure receiving area of the hydraulic actuator, and the transfer torque capacity (receiving area) is controlled in accordance with the input torque so as to prevent the belt from slipping. According to this conventional technology, the transfer torque capacity is controlled by oil pressure instead of the pressure-receiving area.

The aforementioned transfer torque capacity is set so as not to allow the belt to slip, factoring in the torque change characteristic of the drive power source, etc., with a certain safety factor. Therefore, the setting of the transfer torque capacity is not necessarily satisfactory in the case of hybrid vehicles equipped with a plurality of drive power sources. That is, in a hybrid vehicle having an internal combustion engine and an electric motor as drive power sources, it is necessary to employ an increased safety factor since relatively great torque fluctuations are caused by the internal combustion engine. Hence, if the transfer torque capacity is set in consideration of the internal combustion engine, the transfer torque capacity becomes greater than a needed capacity during a vehicle run caused by the electric motor, which produces less fluctuations in torque and allows high control precision. The greater than needed transfer torque capacity increases the power transfer loss of the transmission, the energy loss of an oil pump for producing oil pressure, etc., thus degrading the fuel economy.

This problem occurs not only in the hydraulic belt-type continuously variable transmissions, but also in power transmission apparatus capable of changing the transfer torque capacity. Various examples of the power transmission apparatus include, for example, a running mode changing apparatus, a forward-rearward switch apparatus, or a stepwise variable transmission equipped with clutches and brakes that are hydraulically put into a friction-engaged state, if the transfer torque capacity is controlled in accordance with the transfer torque (input torque).

During a running mode in which the operation states of drive power sources are changed, the torque may fluctuate due to, for example, the startup of the internal combustion engine, the fuel cut, etc. Consequently, the transfer torque capacity may become insufficient, and the belt may slip. If the running mode is changed by changing the engaged/released states of the clutches and brakes, the belt may slip due to torque fluctuations at the time of engagement or release of such a clutch or brake.

At the time of an ascending start on a slope, the vehicle may move down in a direction opposite to the direction of the ascending start. In such a case, there is a possibility that when great torque is applied in the direction of start, the transfer torque capacity may become insufficient and may allow the belt, a clutch or a brake to slip.

SUMMARY OF THE INVENTION

It is an object of the invention to control the transfer torque capacity of a power transmission apparatus so as to reduce the power transfer loss and the energy loss and prevent the slipping of the power transmission apparatus due to insufficient transfer torque capacity.

In a first aspect of the invention, a vehicle drive control apparatus includes a plurality of drive power sources that rotate a drive wheel via a power transfer device that changes a transfer torque capacity, and causes a vehicle to run in a plurality of run modes that differ in states of operation of the drive power sources. This vehicle drive control apparatus changes the transfer torque capacity of the power transfer device in accordance with the run modes.

The transfer torque capacity is a maximum torque that the power transfer device is able to transfer without allowing a slip or the like.

According to the first aspect, the transfer torque capacity of the power transfer device is changed in accordance with the mode of run of the vehicle. Therefore, by setting a minimum sufficient transfer torque capacity in accordance with the torque fluctuation characteristics of the individual drive power sources, it becomes possible to reduce the power transfer loss due to excessive transfer torque capacity and the energy loss of an oil pump or the like for generating a transfer torque capacity while avoiding the slipping of the power transfer device due to insufficient transfer torque capacity. Thus, fuel economy improves.

In the first aspect, the vehicle drive control apparatus may be constructed so that (a) the drive power sources include an internal combustion engine, wherein the run modes include a run mode in which the internal combustion engine is used, and a run mode in which the internal combustion engine is not used, and (b) the transfer torque capacity is made smaller during the run mode in which the internal combustion engine is not used than during the run mode in which the internal combustion engine is used. In this construction, the internal combustion engine is provided as a drive power source and the transfer torque capacity is made smaller during the run mode in which the engine is not used than during the run mode in which the engine is used. Therefore, insufficient transfer torque capacity due to torque fluctuations of the internal combustion engine is avoided. Furthermore, since the transfer torque capacity is made smaller during a run mode in which the internal combustion engine is not used, that is, a run mode in which the torque fluctuation is small, the power transfer loss and the energy loss of the oil pump or the like are reduced and fuel economy is improved.

In a second aspect of the invention, a vehicle drive control apparatus includes a plurality of drive power sources that rotate a drive wheel via a power transfer device that changes a transfer torque capacity, and causes a vehicle to run in a plurality of run modes that differ in states of operation with respect to the drive power sources. The vehicle drive control apparatus increases the transfer torque capacity of the power transfer device when the run mode is changed.

According to the second aspect, since the transfer torque capacity of the power transfer device is increased at the time of the changing of the run mode at which the states of operation of the drive power sources are changed, it is possible to prevent the slipping of the power transfer device due to insufficient transfer torque capacity regardless of, for example, torque fluctuations at the time of startup of an internal combustion engine as a drive power source or at the time of a fuel cut, or torque fluctuations at the time of engagement and release of a clutch and a brake for changing the run mode. That is, by reducing the transfer torque capacity at occasions other than the time of change in the run mode, the power transfer loss due to excessive transfer torque capacity and the energy loss of the oil pump for producing the transfer torque capacity can be reduced and fuel economy is improved.

In the first and second aspects, the vehicle drive control apparatus may include a construction wherein (a) the power transfer device is a continuously variable transmission that comprises an input rotational member, an output rotational member and a transmission member is disposed between the input rotational member and the output rotational member, and the continuously variable transmission shifts a speed by continuously changing radial positions of torque transfer sites between the transmission member and the rotational members with respect to rotation centers of the rotational members, and (b) the drive power sources include an internal combustion engine and an electric motor. Therefore, the transfer torque capacity of the continuously variable transmission is made smaller during a run of the vehicle achieved by the electric motor, which produces only small torque fluctuations and allows high control precision, than during a run of the vehicle achieved by the internal combustion engine. Hence, it is possible to reduce the power transfer loss and the energy loss of the oil pump while avoiding the slipping of the continuously variable transmission due to insufficient transfer torque capacity. Thus, fuel economy is improved. Furthermore, since the transfer torque capacity of the continuously variable transmission is increased at the time of changing the run mode, the slipping of the power transfer device due to insufficient transfer torque capacity is prevented regardless of torque fluctuations at the time of startup of an internal combustion engine or a fuel cut, or torque fluctuations at the time of engagement and release of a clutch and a brake for changing the run mode. Furthermore, since the transfer torque capacity is reduced at a time other than the time of changing the mode, the power transfer loss, the energy loss and the like are reduced.

In the foregoing aspects, the continuously variable transmission may be a belt-type continuously variable transmission that transfers a power by clamping a transmission belt by an oil pressure and that shifts a speed ratio by changing groove widths of a pair of variable pulleys. This makes it possible to reduce the power transfer loss and the energy loss of the oil pump while avoiding the slipping of the belt due to insufficient transfer torque capacity at the time of change in the run mode and difference torque fluctuations in different run modes. Thus, fuel economy is improved. The transmission belt and the two variable pulleys correspond to the transmission member, the input rotational member, and the output rotational member mentioned above. The transfer torque capacity may be changed by changing a belt clamping force applied to the transmission belt.

In the foregoing aspects, the transfer torque capacity of the power transfer device may be increased if the vehicle descends in a direction opposite to a vehicle starting direction. Since the transfer torque capacity of the power transfer device is increased if the vehicle descends in a direction opposite to a vehicle starting direction, it is possible to prevent slipping in the power transfer device due to insufficient transfer torque capacity when great torque is applied in the vehicle starting direction afterwards. That is, by reducing the transfer torque capacity at times other than the time of a gravity-forced descent, the power transfer loss and the energy loss can be reduced.

The invention is suitably applied to a drive control apparatus for a hybrid vehicle equipped with an internal combustion engine and an electric motor as drive power sources, and is also applicable to drive control apparatus for vehicles having other types of drive power sources, or vehicles having drive power sources of the same type with different torque fluctuation characteristics, for example, two internal combustion engines.

The power transfer device capable of changing the transfer torque capacity may be a continuously variable transmission and may also be of various other types, for example, a hydraulic friction engagement device, such as a clutch or a brake that is hydraulically put into friction engagement, a stepwise variable transmission, a forward-rearward changing device, a run mode changing device, etc. The continuously variable transmission may be a hydraulically operated belt-type continuously variable transmission, and may also be of other types, for example, a toroidal type continuously variable transmission, etc.

The power transfer device is suitably applicable to a hydraulic type power transfer device in which power is transferred based on oil pressure and the transfer torque capacity is controlled based on the oil pressure. The transfer torque capacity can be controlled based on a control parameter other than the oil pressure, for example, a pressure receiving area. It is preferable that the transfer torque capacity be controlled to a minimum sufficient magnitude that does not allow a slip, by using the input torque as a parameter, that is, the transfer torque.

The modes of run that differ in the states of operation of the drive power sources include, for example, an engine run mode in which the vehicle operates using only the internal combustion engine as a drive power source, a motor run mode in which the vehicle operates using only the electric motor, etc. A construction is made in which a plurality of run modes are entered by changing the states of connection of a drive power source to the power transfer device through the use of clutches and a brake.

A torque capacity changing device is designed so as to set a transfer torque capacity based on a map and the like pre-determined for each mode of run. The torque capacity changing device may also adopt various manners, for example, a manner in which a predetermined reference value is corrected for each mode of run. It is not necessary to set different transfer torque capacities for all the modes of run. It is also appropriate to change the transfer torque capacity only in predetermined modes of run that differ in the amount of torque fluctuation.

The apparatus in the second aspect of the invention is designed so as to increase the transfer torque capacity by, for example, different increase amounts predetermined separately for the kinds of change in the mode of run. However, the transfer torque capacity may also be increased by a constant amount regardless of the kind of change in the mode of run.

At the time of a descent of the vehicle opposing the vehicle starting direction, the amount of increase in the transfer torque capacity is set using the vehicle speed as a parameter so that the amount of increase is increased as the vehicle speed during the descent increases. However, it is also possible to adopt various other conditions, for example, a condition in which the transfer torque capacity is increased by a fixed amount, a condition in which the transfer torque capacity computing equation is changed in accordance with the change in the state of drive (e.g., a change from a driving state to a driven state) due to a gravitationally forced descent, etc.

The changing or increasing of the transfer torque capacity may be set based on the value of transfer torque capacity, the amount of change, or the amount of increase. It is also possible to adopt various other conditions, for example, a condition in which a rate or the like, for example, a safety factor, is changed or increased.

This invention is intended for a vehicle that has a plurality of drive power sources. However, the invention is also applicable to a vehicle that operates on a single drive power source, such as an internal combustion engine, an electric motor, etc. That is, advantages similar to those mentioned above can be achieved if a drive control apparatus for a vehicle that runs by transferring power from a drive power source to a drive wheel via a power transfer device that changes the transfer torque capacity is equipped with a descent-time transfer torque capacity increasing device for increasing the transfer torque capacity of the power transfer device when the vehicle descends in a direction opposite to the vehicle starting direction.

BRIEF DESCRIPTION OF THE DRAWINGS

The foregoing and further objects, features and advantages of the invention will become apparent from the following description of an exemplary embodiment with reference to the accompanying drawings, wherein like numerals are used to represent like elements and wherein:

FIG. 4 is a diagram illustrating relationships between various modes of run established in the hybrid drive control apparatus shown in FIG. 1 and the states of actuation of the clutches and the brake;

DETAILED DESCRIPTION OF EXEMPLARY EMBODIMENTS

An exemplary embodiment of the invention will be described hereinafter with reference to the accompanying drawings.

Figure 1:
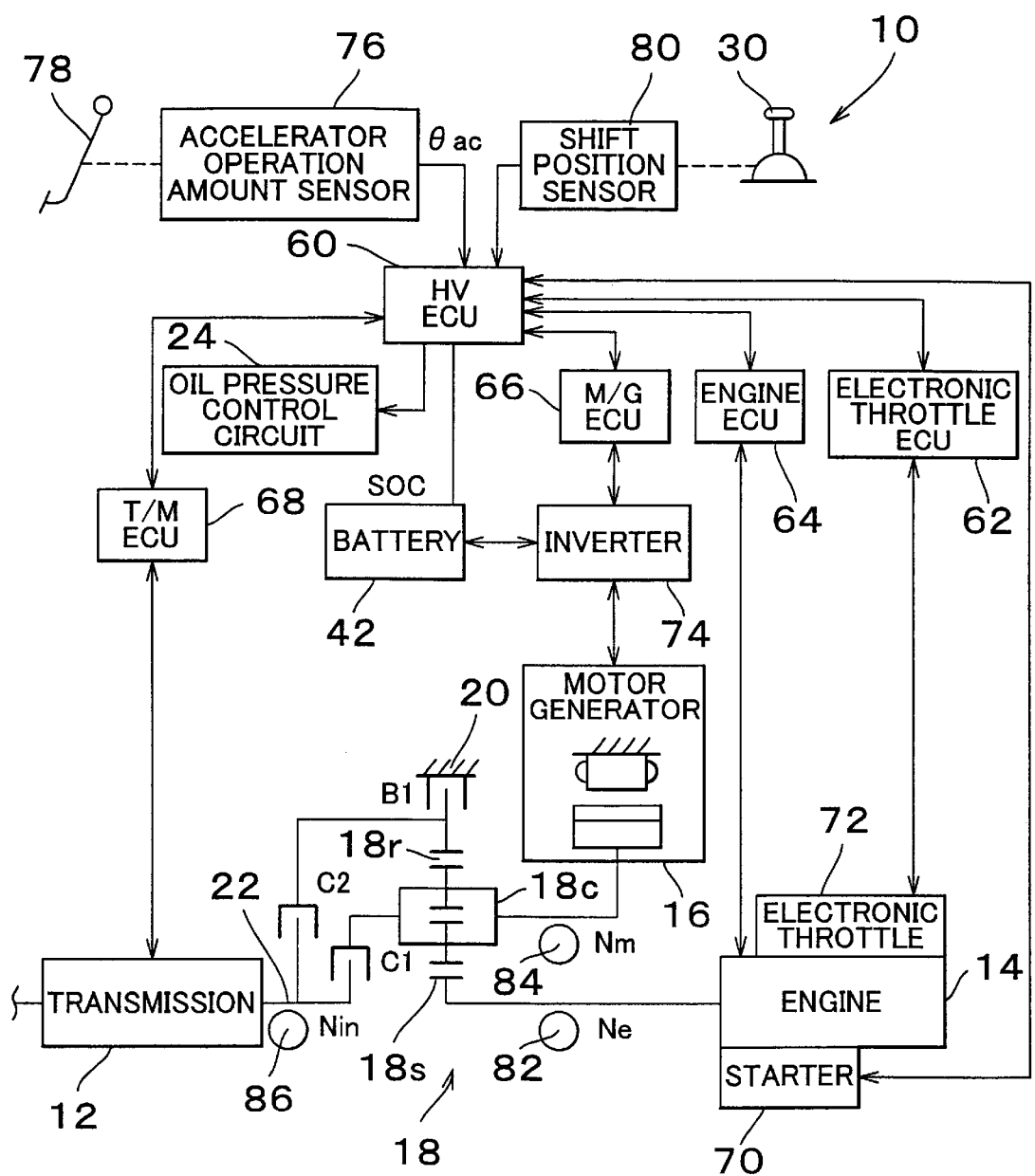
FIG. 1 is a schematic diagram illustrating a hybrid drive control apparatus to which the invention is applied.
Figure 2:
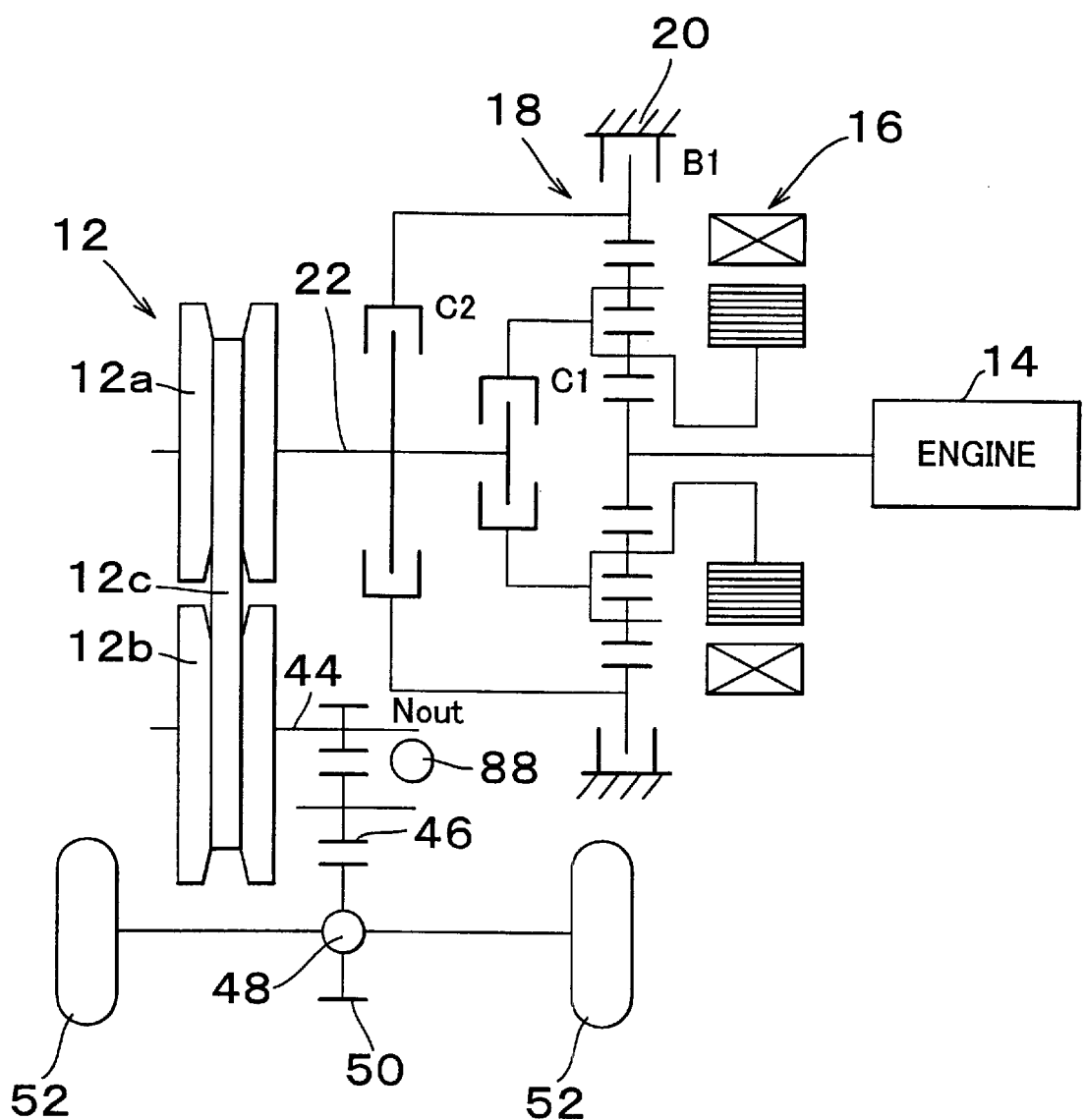
FIG. 2 is a skeleton diagram showing a power transfer system of the hybrid drive control apparatus shown in FIG. 1.

FIG. 1 is a schematic diagram illustrating a hybrid drive control apparatus 10 to which the invention is applied. FIG. 2 is a skeleton diagram showing a transmission 12. The hybrid drive control apparatus 10 includes an engine 14 that generates power through combustion of fuel, a motor generator 16 for use as an electric motor and an electric power generator, and a double-pinion type planetary gear train 18. The hybrid drive control apparatus 10 is installed in a transversal placement in a vehicle. A sun gear 18s of the planetary gear train 18 is connected to the engine 14, and a carrier 18c is connected to the motor generator 16, and a ring gear 18r is connected to a case 20 via a first brake B1.

Furthermore, the carrier 18c is connected to an input shaft 22 of the transmission 12 via a first clutch C1, and the ring gear 18r is connected to the input shaft 22 via a second clutch C2. The engine 14 is an internal combustion engine. The engine 14 and the motor generator 16 correspond to a plurality of drive power sources.

The clutches C1, C2 and the first brake B1 are multi-plate wet type hydraulic friction engagement devices that are put into friction engagement by hydraulic actuators. Each of the friction engagement devices is friction-engaged by an operating oil supplied from a hydraulic control circuit 24.

Figure 3:
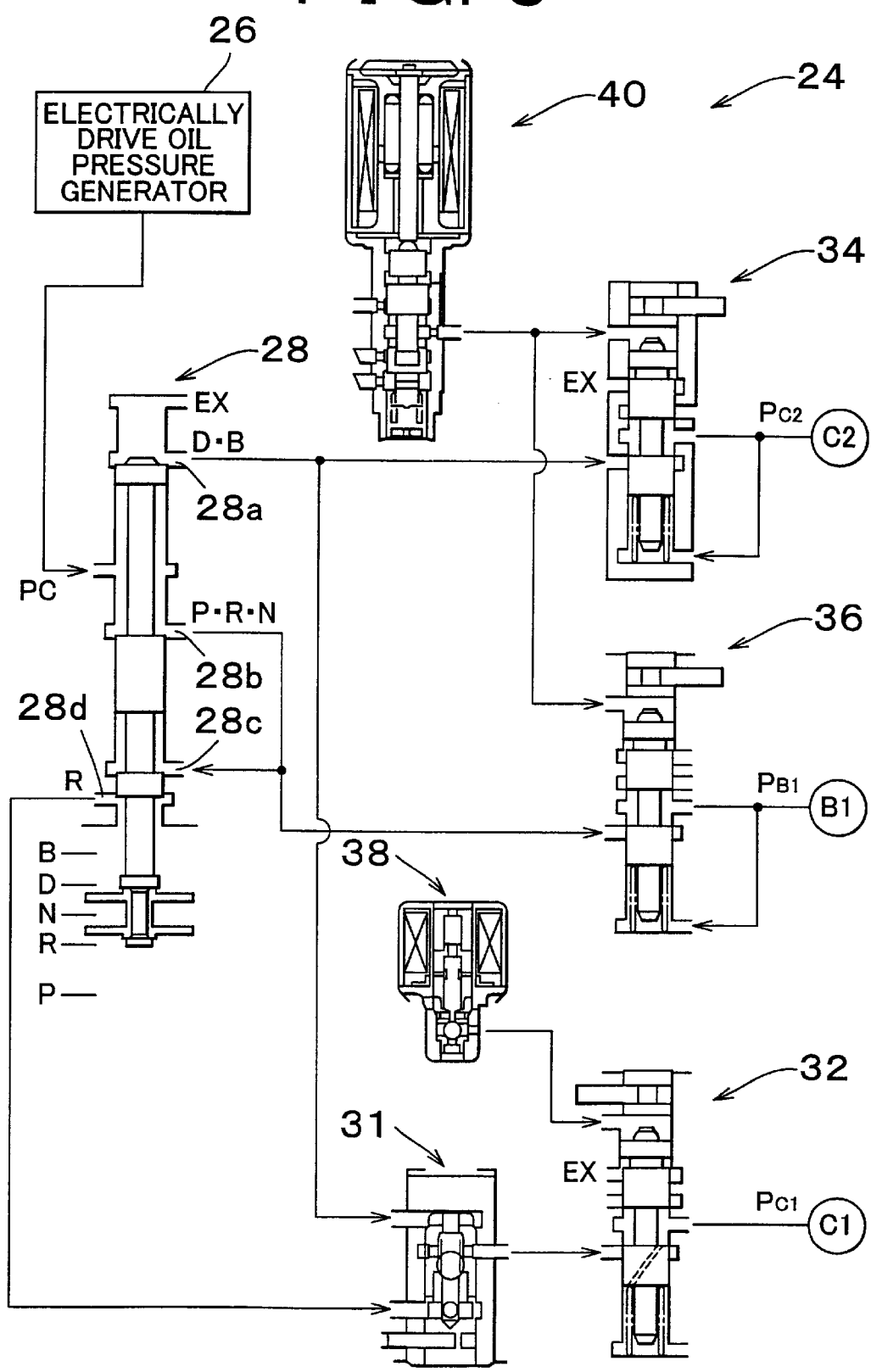
FIG. 3 is a circuit diagram illustrating a run mode changing portion of a hydraulic control circuit shown in FIG. 1.

FIG. 3 is a diagram illustrating portions of the hydraulic control circuit 24. A source pressure PC generated by an electrically driven oil pressure generator device 26 that includes a motor-driven pump is supplied to the clutches C1, C2 and the brake B1 via a manual valve 28 in accordance with the shift position of a shift lever 30 (see, e.g., FIG. 1). The shift lever 30 is a shift operating member that is operated by a driver. In this embodiment, the shift lever 30 is selectively operated in five shift positions, that is, "B", "D", "N", "R", "P". The manual valve 28 is connected to the shift lever 30 via a cable, a link, etc., and is mechanically switched in accordance with the operation of the shift lever 30.

The "B" position is a shift position that causes generation of a relatively great power source brake due to a downshift of the transmission 12 during a forward run of the vehicle or the like. The "D" position is a shift position for a forward run of the vehicle. When the shift lever 30 is at one of these shift positions, the source pressure PC is supplied from an output port 28a to the clutches C1, C2. The first clutch C1 is supplied with the source pressure PC via a shuttle valve 31. The "N" position is a shift position for interrupting the power transfer from the drive power sources. The "R" position is a shift position for a reverse run of the vehicle. The "P" position is a shift position for interrupting the power transfer from the drive power sources and for mechanically preventing rotation of drive wheels through the use of a parking lock device (not shown). When any one of these shift positions is selected, the source pressure PC is supplied from an output port 28b to the first brake B1. The source pressure PC output from the output port 28b is input to a return port 28c as well. When the "R" position is selected, the source pressure PC is led from the return port 28c to an output port 28d, and is supplied therefrom to the first clutch C1 via the shuttle valve 31.

The clutches C1, C2 and the first brake B1 are provided with control valves 32, 34, 36, respectively, which control oil pressures $P_{C1}$, $P_{C2}$, $P_{B1}$ of the clutches C1, C2 and the first brake B1. The oil pressure $P_{C1}$ of the clutch C1 is regulated by an on-off valve 38, and the oil pressures of the clutch C2 and the brake B1 are regulated by a linear solenoid valve 40.

In accordance with the operation states of the clutches C1, C2 and the brake B1, various running modes of the vehicle as shown in FIG. 4 are set. The clutches C1, C2, the brake B1 and the planetary gear train 18 form a running mode changing device. In FIG. 4, symbol "O" indicates engagement of a clutch or a brake, symbol "X" indicates release thereof, and symbol "Δ" indicates slip engagement thereof. At the time of the "B" position or the "D" position, one of an "ETC run mode", a "locked-up run mode", and a "motor run mode (forward)" is entered. During the "ETC run mode", a state where the second clutch C2 is engaged and the first clutch C1 and the first brake B1 are released, that is, a state where the sun gear 18s, the carrier 18c and the ring gear 18r are rotatable relatively to one another, is maintained, and both the engine 14 and the motor generator 16 are operated to apply torque to the sun gear 18s and the carrier 18c to rotate the ring gear 18r and therefore run the vehicle forward. During the "locked-up run mode", a state where the clutches C1, C2 are engaged and the first brake B1 is released is maintained, and the engine 14 is operated to run the vehicle forward. During the "motor run mode (forward)", the motor generator 16 is operated with the first clutch C1 engaged and the second clutch C2 and the first brake B1 released, so that the vehicle runs forward. Furthermore, during the "motor run mode (forward)", electricity can be generated from kinetic energy of the vehicle so as to charge a battery 42 (see, e.g., FIG. 1) and generate a braking force on the vehicle through the regeneration control of the motor generator 16 at the time of release of the accelerator pedal or the like.

When the "N" position or the "P" position is selected, a "neutral mode" or a "charge/engine start mode" is entered. During the "neutral mode", the clutches C1, C2 and the first brake B1 are all released. During the "charge/engine start mode", the clutches C1, C2 are released and the brake B1 is engaged, and the motor generator 16 is reversed to start the engine 14, or the motor generator 16 is driven by the engine 14 via the planetary gear train 18 and the regeneration control of the motor generator 16 is performed so as to generate electric power and thereby charge the battery 42 (see, e.g., FIG. 1).

When the "R" position is selected, a "motor run mode (reverse)" or a "friction run mode" is entered. During the "motor run mode (reverse)", the first clutch C1 is engaged and the second clutch C2 and the first brake B1 are released. While this state is maintained, the motor generator 16 is reversely driven to reversely turn the carrier 18c and therefore the input shaft 22, so that the vehicle is reversely run. During the "friction run mode", the engine 14 is started with the first clutch C1 engaged and the second clutch C2 released, so as to forwardly rotate the sun gear 18s. While the ring gear 18r is rotating in the forward direction along with the rotation of the sun gear 18s, the first brake B1 is brought into slip engagement to restrict the rotation of the ring gear 18r so that a reverse turning force is applied to the carrier 18c for a reverse run of the vehicle. Simultaneously, the motor generator 16 may be reversely driven (powering control).

The transmission 12, which is a hydraulic belt-type continuously variable transmission (CVT), outputs power from an output shaft 44. The power is then transferred to a ring gear 50 of a differential device 48 via a counter gear 46. The differential device 48 distributes power to right and left-side drive wheels (front wheels) 52. The transmission 12 has a pair of variable pulleys 12a, 12b and a transmission belt 12c disposed on the variable pulleys 12a, 12b. The transmission speed ratio γ (=input rotational speed Nin/output rotational speed Nout) is continuously changed by changing the width of a V-groove of the primary-side (input side) variable pulley 12a via a hydraulic cylinder. The belt clamping force (tension) is adjusted by a hydraulic cylinder of the secondary-side (output side) variable pulley 12b. The hydraulic control circuit 24 has a circuit for controlling the speed ratio γ of the transmission 12 and the belt tension, and is supplied with operating oil from a common electrically driven oil pressure generator device 26. The transmission 12 is a power transmission apparatus capable of changing the transfer torque capacity, in which the transfer torque capacity is controlled by the oil pressure on the secondary-side variable pulley 12b. The variable pulley 12a corresponds to an input rotational member, and the variable pulley 12b corresponds to an output rotational member. The transmission belt 12c corresponds to a transmission member.

The hybrid drive control apparatus 10 of the embodiment changes the vehicle running mode through the use of an HV ECU 60 shown in FIG. 1. The HV ECU 60 includes a CPU, a RAM, a ROM, etc. The HV ECU 60 controls an electronic throttle ECU 62, an engine ECU 64, a motor generator ECU 66, a transmission ECU 68, the on-off valve 38 of the hydraulic control circuit 24, the linear solenoid valve 40, a starter 70 of the engine 14, etc., in accordance with programs pre-stored in the ROM, while using a temporary memory function of the RAM. The electronic throttle ECU 62 controls the opening and closure of an electronic throttle valve 72 of the engine 14. The engine ECU 64 controls the output of the engine 14 via the amount of fuel injected in the engine 14, a variable valve timing mechanism, an ignition timing, etc. The motor generator ECU 66 controls the powering torque, the regenerative braking torque the motor generator 16 via an inverter 74. The transmission ECU 68 controls the speed ratio γ, the belt tension and the transmission 12.

In the illustrated embodiment, the controllers (HV ECU 60, electronic throttle ECU 62, engine ECU 64, motor generator ECU 66 and transmission ECU 68) are implemented as programmed general purpose computers. It will be appreciated by those skilled in the art that each controller can be implemented using a single special purpose integrated circuit (e.g., ASIC) respectively, having a main or central processor section for overall, system-level control, and separate sections dedicated to performing various different specific computations, functions and other processes under control of the central processor section. Each controller can be a plurality of separate dedicated or programmable integrated or other electronic circuits or devices (e.g., hardwired electronic or logic circuits such as discrete element circuits, or programmable logic devices such as PLDs, PLAs, PALs or the like). Each controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

The HV ECU 60 is supplied with a signal from an accelerator operation amount sensor 76 which indicates an operation amount θac of an accelerator pedal 78 provided as an accelerator operating member, and is supplied with a signal from a shift position sensor 80 which indicates the operated position of the shift lever 30 (shift position). The HV ECU 60 is further supplied with signals from an engine rotation speed sensor 82, a motor rotation speed sensor 84, an input shaft rotation speed sensor 86 and an output shaft rotation speed sensor 88 indicating the engine rotation speed (number of rotations) Ne, the motor rotation speed (number of rotations) Nm, the input shaft rotation speed (rotation speed of the input shaft 22) Nin and the output shaft rotation speed (rotation speed of the output shaft 44) Nout, respectively. The output shaft rotation speed Nout corresponds to the vehicle speed V. The accelerator operation amount θac represents the amount of output requested by a driver.

Figure 5:
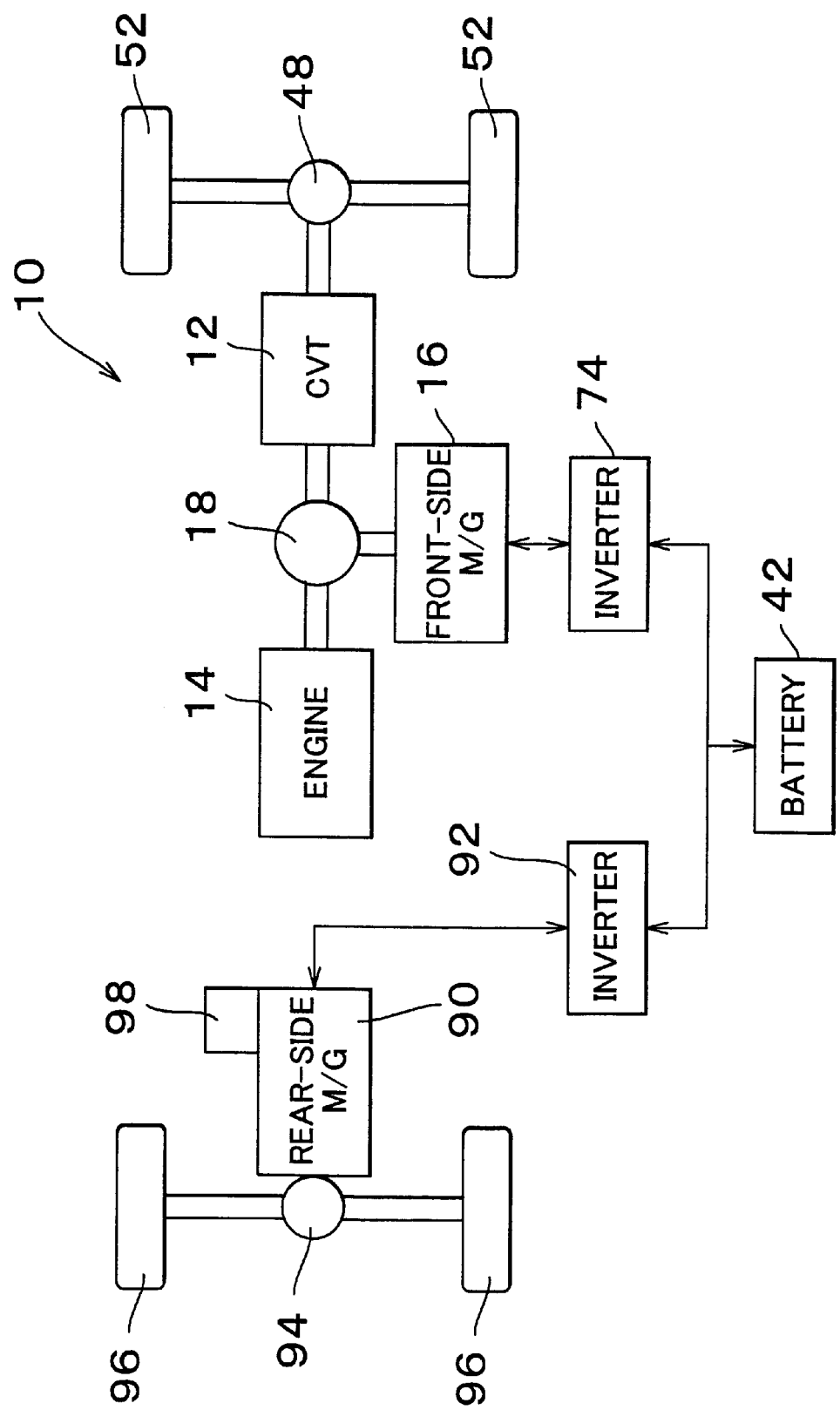
FIG. 5 is a schematic diagram illustrating the entire drive apparatus that includes a rear-side motor generator for driving rear wheels.

In this embodiment, a rear-side motor generator 90 is provided in addition to the hybrid drive control apparatus 10 as shown in FIG. 5. The rear-side motor generator 90 is electrically connected to the battery 42 via an inverter 92 for a powering control and a regenerative control. The rear-side motor generator 90 is mechanically connected to left and right-side rear wheels 96 via a differential device 94. The rear-side motor generator 90 functions as an electric motor to rotate the rear wheels 96 due to the powering control, and applies regenerative braking force to the rear wheels 96 due to the regenerative control. The rear-side motor generator 90 is also controlled by the HV ECU 60. Under a predetermined condition at the time of, for example, a start of the vehicle, a run on a low-μ road, etc., the rear wheels 96 are driven, in addition to the front wheels 52. In that case, a signal that indicates the motor rotation speed Nrm of the rear-side motor generator 90 is supplied from a motor rotation speed sensor 98, such as a resolver or the like, to the HV ECU 60.

Figure 6:
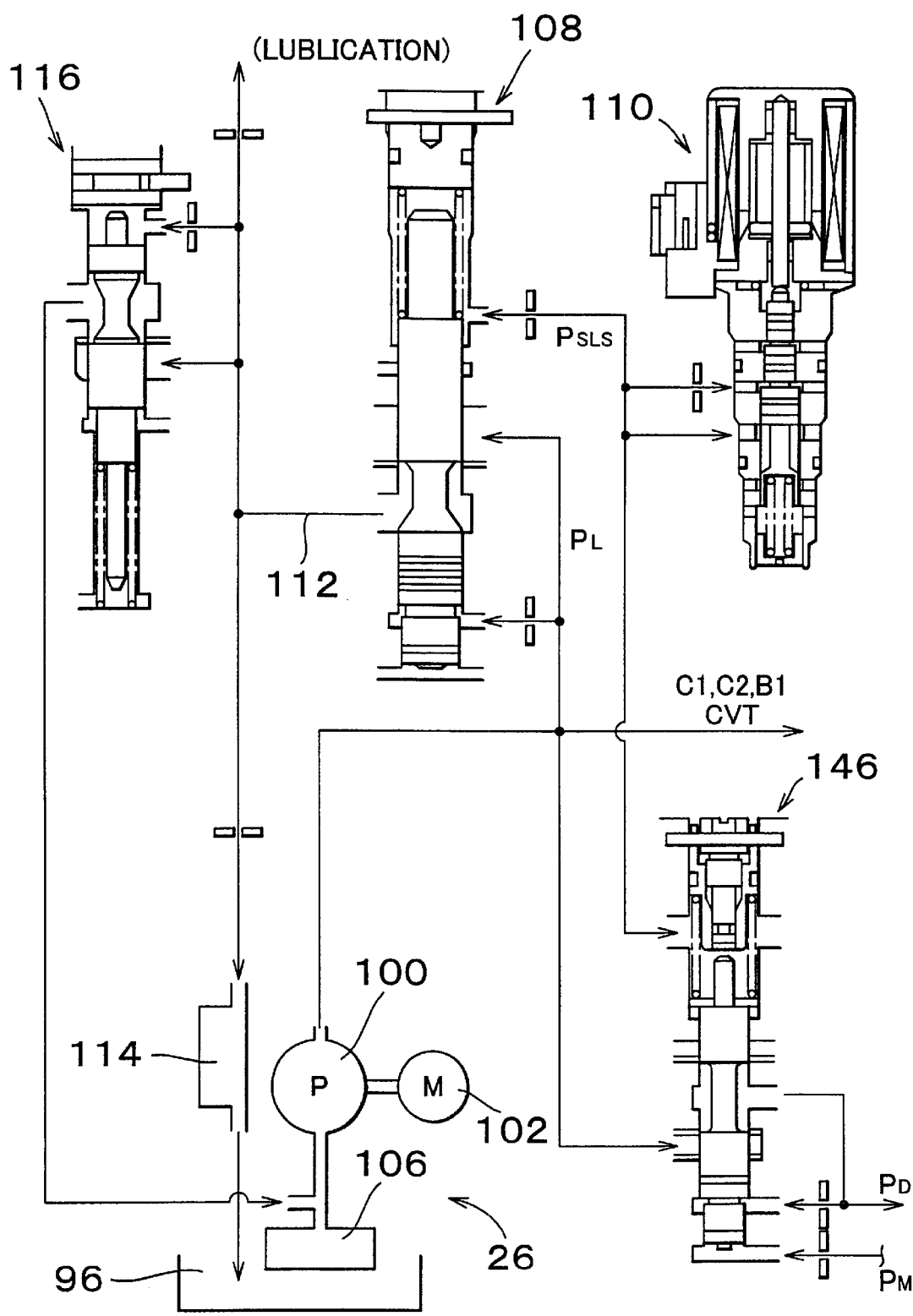
FIG. 6 is a circuit diagram illustrating an oil pressure generating portion and a clamping pressure control portion of a hydraulic control circuit.

FIG. 6 is a circuit diagram illustrating portions of the hydraulic control circuit 24 that generate a line oil pressure $P_L$ that serves as a basis of the source pressure PC. An oil pump 100 is rotary pump such as a gear pump or the like, and is driven by a dedicated electric motor 102. The oil pressure generator device 26 includes the oil pump 100 and the electric motor 102. The operating oil pumped up by the oil pump 100 via a strainer 106 is adjusted to a predetermined line oil pressure $P_L$ by a primary regulator valve 108 that serves as a pressure control valve. The primary regulator valve 108 is supplied with a signal pressure $P_{SLS}$ of a linear solenoid valve 110 that is duty-controlled by the HV ECU 60. In accordance with the signal pressure $P_{SLS}$, the line oil pressure $P_L$ is controlled. Furthermore, a surplus amount of the operating oil is drained to an oil passage 112. The line oil pressure $P_L$ is used not only as a basis for the source pressure PC, but is also used in the shift control of the transmission 12 and the control of the belt clamping force. The line oil pressure $P_L$ is controlled so as to reach a target line oil pressure $P_L^*$ determined from, for example, the accelerator operation amount θac, that is, transfer torques of various portions, as parameters. The operating oil of the oil passage 112 is supplied to lubrication sites of various portions of the hydraulic control circuit 24, and a portion of operating oil is supplied to an oil cooler 114. The pressure of the operating oil is regulated to a predetermined oil pressure by a pressure regulating valve 116 so that suitable amounts of operating oil will be supplied to the lubrication sites and the oil cooler 114.

Figure 7:
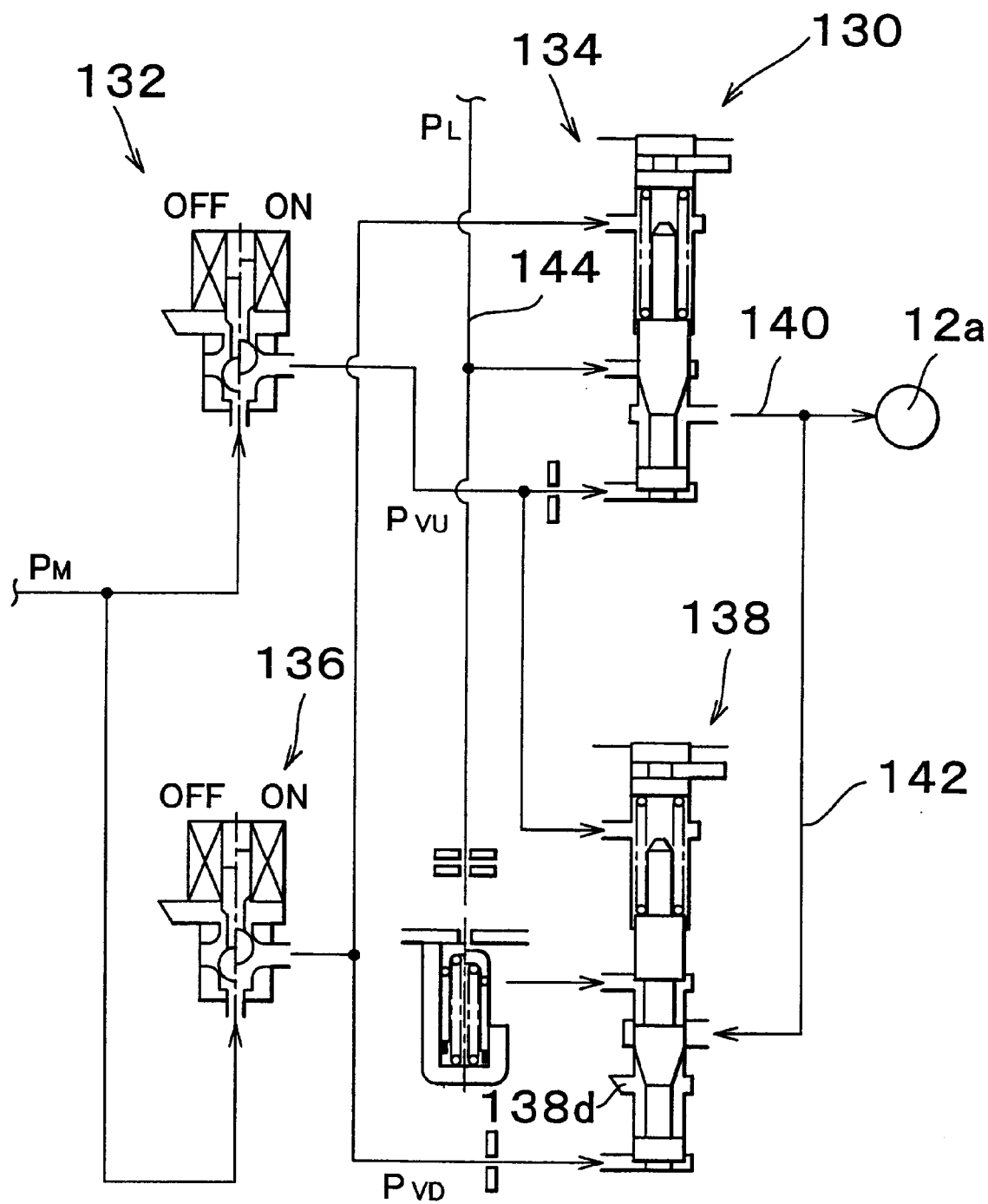
FIG. 7 is a circuit diagram illustrating portions for shift control of the transmission, of the hydraulic control circuit.

FIG. 7 shows a shift control circuit 130 that controls the speed ratio γ of the transmission 12. The shift control circuit 130 includes a flow control valve 134 and an upshift electromagnetic on-off valve 132 for reducing the transmission speed ratio γ, and a flow control valve 138 and a downshift electromagnetic on-off valve 136 for increasing the speed ratio γ. If the upshift electromagnetic on-off valve 132 is duty-controlled by the transmission ECU 68, a predetermined control pressure $P_{VU}$ obtained by reducing the modulator pressure $P_M$ is output to the flow control valve 134. The line oil pressure $P_L$ regulated corresponding to the control pressure $P_{VU}$ is supplied to the hydraulic cylinder of the primary-side variable pulley 12a via a supply passage 140, so that the V-groove width of the pulley is reduced and therefore the speed ratio γ reduces. If the downshift electromagnetic on-off valve 136 is duty-controlled by the transmission ECU 68, a predetermined control pressure $P_{VD}$ obtained by reducing the modulator pressure $P_M$ is output to the flow control valve 138. Corresponding to the control pressure $P_{VD}$, a drain port 138d is opened, so that the operating oil in the primary-side variable pulley 12a is drained at a predetermined amount of flow via a discharge passage 142, and therefore the V-groove width increases and the speed ratio γ increases. Even if the speed ratio γ is substantially constant and there is no need to supply operating oil to the primary-side variable pulley 12a, the flow control valve 134 maintains communication between a line oil passage 144 and the supply passage 140 with a predetermined passage sectional area for a predetermined oil pressure, in order to prevent changes in the speed ratio due to oil leakage.

Figure 8:
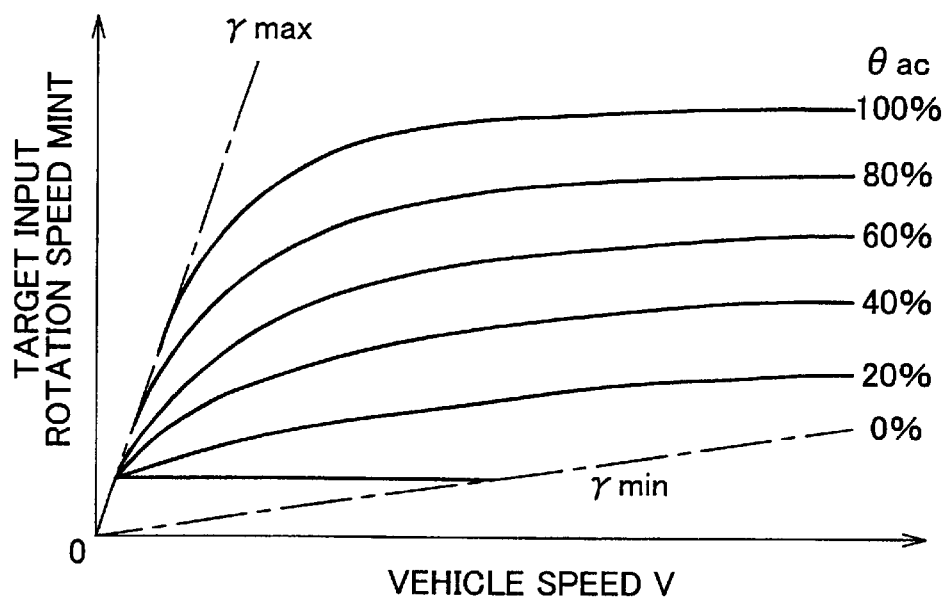
FIG. 8 is a diagram indicating a data map for computing a target input rotation speed NINT by using the vehicle speed V and the accelerator operation amount θac as parameters in the shift control of the transmission.

The aforementioned shift control is performed as follows. Referring to FIG. 8, a target input rotation speed NINT is computed from a predetermined map that employs the accelerator operation amount θac and the vehicle speed V (corresponding to the output rotation speed Nout). Then, the electromagnetic on-off valves 132, 136 are feedback-controlled so that the actual rotation speed Nin becomes equal to the target input rotation speed NINT. In FIG. 8, γmax represents a maximum speed ratio, and γmin represents a minimum speed ratio.

The oil pressure $P_D$ of the hydraulic cylinder of the secondary-side variable pulley 12b is regulated by a clamping pressure control valve 146 shown in FIG. 6, so as to prevent the transmission belt 12c from slipping. The clamping pressure control valve 146 is supplied with the line oil pressure $P_L$, the signal pressure $P_{SLS}$, and the modulator pressure $P_M$. The oil pressure $P_D$ is continuously controlled in accordance with the signal pressure $P_{SLS}$ output from the linear solenoid valve 110. As the oil pressure $P_D$ increases, the belt clamping pressure, that is, the friction force between the transmission belt 12c and the variable pulleys 12a, 12b, increases, and the transfer torque capacity increases.

Figure 9:
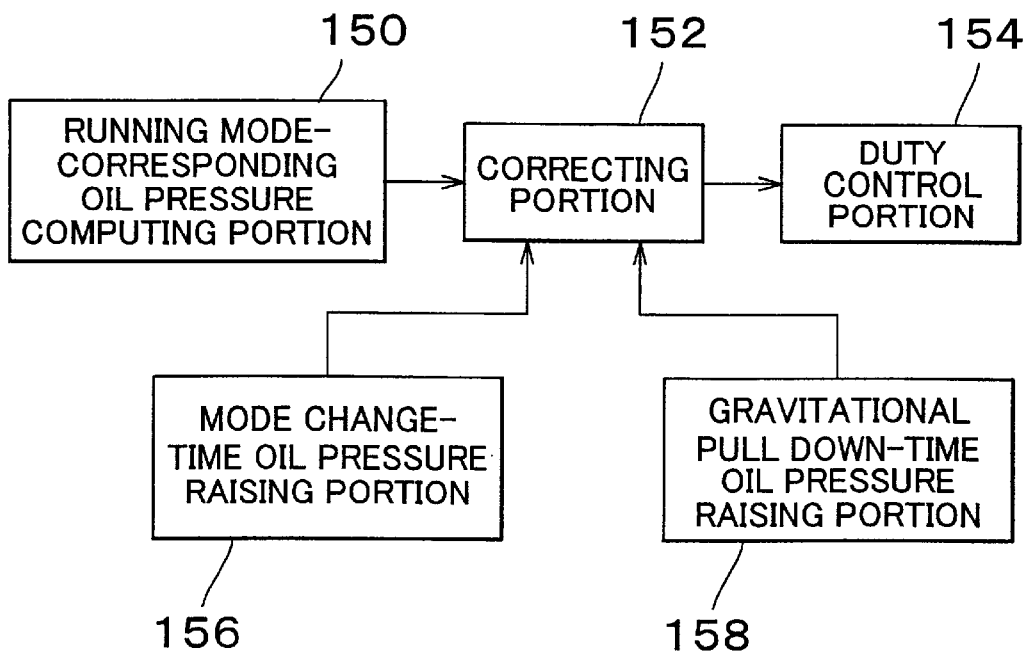
FIG. 9 is a block diagram illustrating the functions related to the clamping pressure control of the transmission executed by a transmission ECU.
Figure 10:
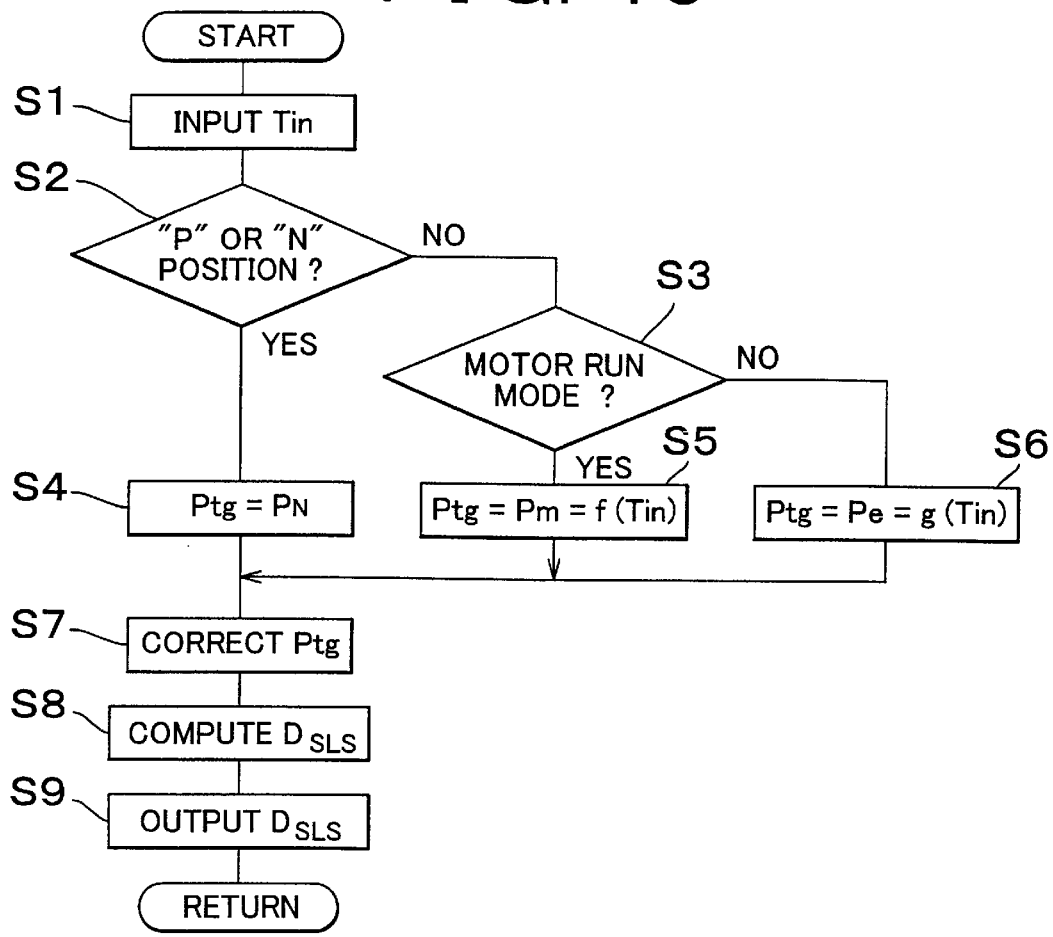
FIG. 10 is a flowchart illustrating detailed content of the clamping pressure control executed by the functions illustrated in FIG. 9.

FIG. 9 is a block diagram illustrating functions of the transmission ECU 68 related to the clamping pressure control. The transmission ECU 68 includes running mode-corresponding oil pressure computing portion 150, correcting portion 152, and duty control portion 154. The transmission ECU 68 controls the oil pressure $P_D$ while performing correction in accordance with a correction command supplied to the correcting portion 152 from mode change-time oil pressure raising portion 156 and a gravitational pull down-time oil pressure raising portion 158. The flowchart of FIG. 10 illustrates detailed contents of the clamping pressure control. Steps S1 to S6 are executed by the running mode-corresponding oil pressure computing portion 150. Step S7 is executed by the correcting portion 152. Steps S8 and S9 are executed by the duty control portion 154. In order to minimize the transfer torque capacity without allowing the slipping of the belt, the correcting portion 152 is supplied with various correction commands in accordance with the state of operation, in addition to the correction commands from the mode change-time oil pressure raising portion 156 and the gravitational pull down-time oil pressure raising portion 158.

In step S1 in FIG. 10, an estimated input torque Tin that is serially computed by the HV ECU 60 and the like is input. The estimated input torque Tin is an estimated value of the torque input to the transmission 12. That is, Tin is an estimated value of the transfer torque of the transmission 12, and is determined in accordance with the running mode and the like. The estimated value of Tin is based on, for example, a motor torque command value, an estimated engine torque estimated from the amount of air taken into the engine 14 and the like, etc.

In step S2, it is determined whether the operated position of the shift lever 30 is one of the "N" position and the "P" position. If the position of the shift lever 30 is the "N" position or the "P" position, the process proceeds to step S4, in which a predetermined constant oil pressure $P_N$ is set as a target oil pressure Ptg for the belt clamping pressure. When the "N" or "P" position is selected, the power transfer between the transmission 12 and the engine 14 or the motor generator 16 is shut down. Therefore, the transfer torque of the transmission 12 is substantially "0" not only during a stop of the vehicle, but also during operation of the vehicle, such as a coasting or inertia operation and the like. The oil pressure $P_N$ is set at a lowest-possible value under a condition that the belt does not slip during a speed shift, a vehicle deceleration or the like, due to the inertias of the primary-side variable pulley 12a, the input shaft 22, etc.

If the operated position of the shift lever 30 is other than the "N" position and the "P" position and the determination at step S2 is "NO" (negative), it is determined in step S3 whether the present mode is a motor run mode. That is, whether the present mode is one of the "motor run mode (forward)" and the "motor run mode (reverse)" in which the first clutch C1 is engaged and both the second clutch C2 and the first brake B1 are released, and therefore the engine 14 is disconnected and the motor generator 16 alone is used as a drive power source to run the vehicle. If the presently selected mode is one of the motor run modes, a predetermined oil pressure Pm is set as a target oil pressure Ptg in step S5. If the present mode is not a motor run mode, that is, if the engine 14 is in operation and is related to the drive power, a predetermined oil pressure Pe is set as a target oil pressure Ptg in step S6.

The aforementioned oil pressures Pm, Pe are determined by using the estimated input torque Tin and the speed ratio γ as parameters. As the estimated input torque Tin increases, the oil pressures Pm, Pe increase. As the speed ratio γ increases, the oil pressures Pm, Pe increase.

Figure 13A:
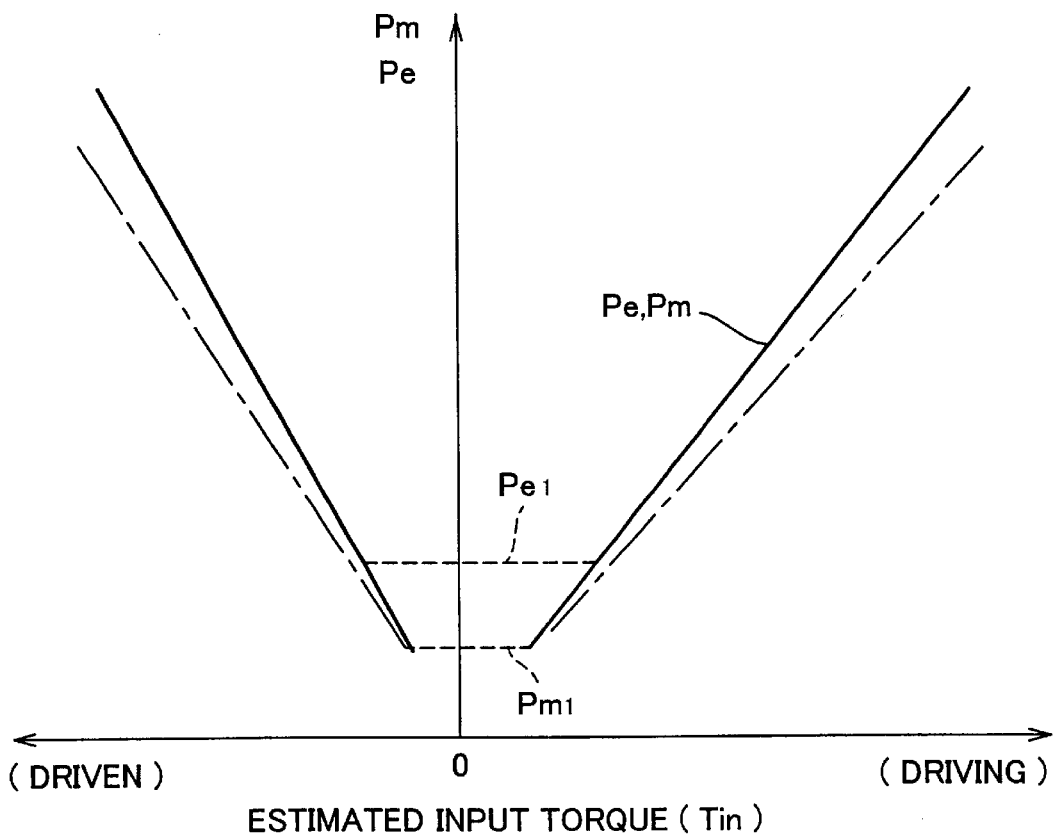
FIGS. 13A and 13B are diagrams indicating relationships between the estimated input torque Tin and the oil pressures Pm, Pe determined in steps S5 and S6 in FIG. 10, and a relationship between the oil pressure Pm, Pe and the speed ratio γ.

FIG. 13A illustrates a characteristic of the oil pressures Pm, Pe with respect to the estimated input torque Tin when the speed ratio γ is constant (for example, γ=1.0). As indicated by solid lines, both oil pressures Pm, Pe increase with increases in the estimated input torque Tin. The oil pressures Pm, Pe are different from each other in lower limit guards Pm1, Pe1 provided in a range where the estimated input torque Tin is small. That is, since the engine 14 rotates due to internal explosions, the engine 14 has greater torque fluctuations than the motor generator 16. The effect of torque fluctuations is great in a low torque region. Therefore, in order to prevent a belt slip from being caused by a torque fluctuation, the lower limit guard Pe1 of the oil pressure Pe at the time of operation of the engine is set greater than the lower limit guard Pm1 of the oil pressure Pm. The solid lines in FIG. 13A are determined by multiplying the needed oil pressure determined through an experiment, a simulation, etc., by a predetermined safety factor. With regard to the oil pressure Pm during the motor run mode in which the engine 14 is not involved and high-precision torque control is possible, the safety factor may be further reduced as well as the lower limit guard Pm1 of the oil pressure Pm so that the oil pressure is smaller as a whole than the oil pressure PC by reducing the safety factor and the lower limit guard Pm1.

Figure 13B:
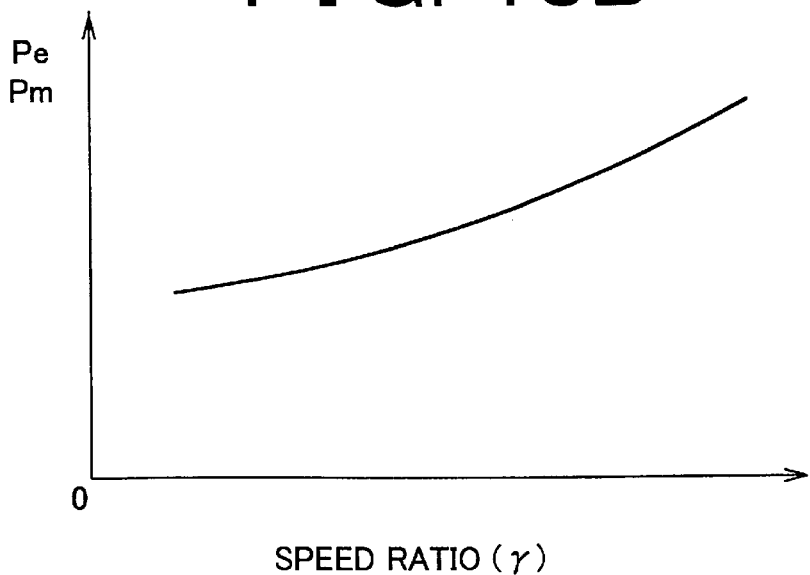

FIG. 13B illustrates a characteristic of the oil pressures Pm, Pe with respect to the speed ratio γ when the estimated input torque Tin is constant. The oil pressures Pm, Pe increase as the speed ratio γ increases. In FIG. 13A, the characteristic curve, at the time of being driven, is steeper than the characteristic curve at the time of driving, due to different hardware constructions, such as pressure-receiving areas of the variable pulleys 12a, 12b, etc. The time of being driven is a time when power transfer from the secondary-side variable pulley 12b to the primary-side variable pulley 12a is performed, for example, the time of regenerative brake performed by the motor generator 16.

After the target oil pressure Ptg is set in steps S4, S5 or S6, the target oil pressure Ptg is corrected in step S7 in accordance with a correction command supplied from the mode change-time oil pressure raising portion 156, the gravitational pull down-time oil pressure raising portion 158, etc., in accordance with the state of operation. If a plurality of correction commands are simultaneously supplied, the target oil pressure Ptg is corrected based on the highest oil pressure correction.

Figure 11:
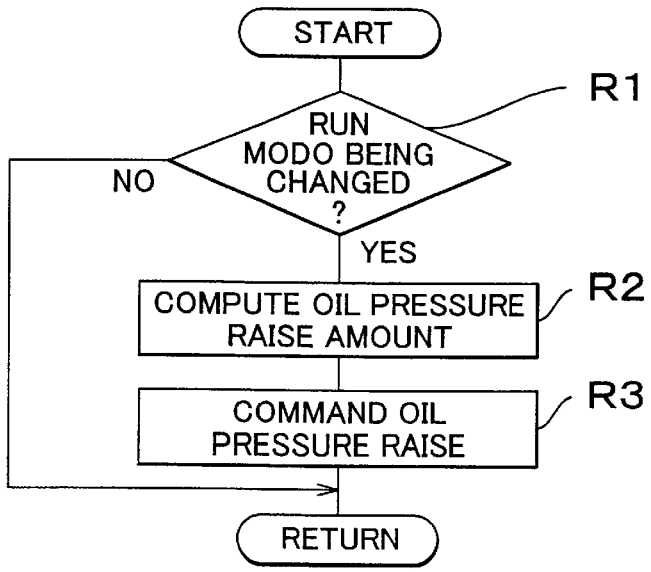
FIG. 11 is a flowchart illustrating detailed content of a signal processing executed by mode change-time oil pressure raising device illustrated in FIG. 9.

The mode change-time oil pressure raising portion 156 temporarily increases the transfer torque capacity, that is, the target oil pressure Ptg, at the time of changing of the running mode. More specifically, the mode change-time oil pressure raising portion 156 performs the processing of a signal in accordance with the flowchart of FIG. 11. In step R1, it is determined whether the mode of run is being changed based on the signal processing of the HV ECU 60, or the like. If the mode of run is being changed, an oil pressure increase amount is computed in step R2. During the changing of the mode of run, torque fluctuates at the time of engagement and release of the clutches C1, C2 and the brake B1, and torque fluctuations may also occur at the time of startup of the engine 14, the fuel cut, etc. As for the oil pressure increase amount, constant values are pre-determined in accordance with the type of changing of the mode of run. Subsequently in step R3, a correction command that indicates the oil pressure increase amount is output.

The oil pressure raising correction at the time of a mode change may be performed only at the time of a change between drive run modes, such as, the motor run modes, the locked-up run mode, the ETC run mode, the friction run mode, etc. However, the oil pressure raising correction is also performed at the time of a mode change between a drive run mode and a non-drive run mode, for example, a "D" to "N" shift change or the like, because torque fluctuates due to a torque backlash at the time of such a mode change. It is also appropriate to set a certain oil pressure increase amount that will prevent the slipping of the belt regardless of the kind of change in the mode of run.

The gravitational pull down-time oil pressure raising portion 158 increases the transfer torque capacity, that is, the target oil pressure Ptg, when the vehicle is gravitationally drawn down in the direction opposite to the direction of starting the vehicle at the time of a hill climb start or the like. More specifically, the signal processing is performed in accordance with the flowchart of FIG. 12. In step Q1, it is determined whether the operated position of the shift lever 30 is in a non-drive position, that is, one of the "N" position and the "P" position. If the operated position of the shift lever 30 is in the "N" position or the "P" position, the process starting at step Q9 is executed. Conversely, if the operated position of the shift lever 30 is other than the "N" and "P" positions, it is determined in step Q2 whether the engine is in an idling state and the vehicle speed is set to V=0. The idling state is a state where the degree of opening of the electronic throttle valve 72 is substantially zero, and can be determined based on the output signal of the electronic throttle ECU 62, a detection signal from an idle switch or a throttle valve opening sensor provided on the electronic throttle valve 72, etc. If the engine is in the idling state and the vehicle speed is V=0, the process starting at step Q9 is executed. Otherwise, it is determined in step Q3 whether a gravitationally forced descent of the vehicle is detected. A gravitationally forced descent of the vehicle can be detected based on, for example, whether the rotational direction of the motor rotation speed Nrm of the rear-side motor generator 90 matches the position of the shift lever 30. More specifically, if the rotational direction is the direction of reverse run of the vehicle when the "D" or "B" position is selected, or if the rotational direction is the direction of forward run of the vehicle when the "R" position is selected, it is determined that the vehicle is being gravitationally drawn down. The possibility of rotation of the rear-side motor generator 90 is low not only during the non-operating state of the rear-side motor generator 90, but is also low during the operating state because the rear-side motor generator 90 is used only for an auxiliary purpose. Therefore, the rotational direction of the motor rotation speed Nrm indicates the moving direction of the vehicle.

If a gravitationally forced descent of the vehicle is detected in step Q3, an execution flag is turned on in step Q4, and a return timer is cleared in step Q5. Subsequently in step Q6, the amount of oil pressure increase is computed. In the case of a gravitationally forced descent at the time of a start of the vehicle, there is a high possibility that a torque in the vehicle starting direction will be sharply applied. Furthermore, as the gravitationally drawn vehicle speed increases, the load on the transmission 12 at the time of application of a vehicle starting torque increases. Therefore, the amount of oil pressure increase is set at increased values as the gravitationally drawn vehicle speed increases. Subsequently in step Q7, a correction command indicating the amount of oil pressure increase is output.

During a gravitationally forced descent, the vehicle is in a driven state, and therefore the target oil pressure Ptg should be set with reference to the map on the (DRIVEN) side in FIG. 13A in steps S5 or S6 in FIG. 10. However, in normal cases, the vehicle immediately exits the gravitationally drawn state, and enters the (DRIVING) side. Therefore, in this embodiment, the target oil pressure Ptg is set by using the map on the (DRIVING) side even during a gravitationally forced descent. Therefore, the target oil pressure Ptg set as described above is lower than the actually needed value of oil pressure. Hence, in step Q6 in FIG. 12, the amount of oil pressure increase is computed based on the differential pressure with respect to the value of oil pressure on the (DRIVEN) side so that a value greater than the differential pressure is set. Therefore, it becomes possible to smoothly control the oil pressure $P_D$ at the time of a change from the driven state (gravitationally forced descent) to the driving state while preventing the belt from slipping when the added torque is increased at the time of a gravitationally forced descent.

Figure 12:
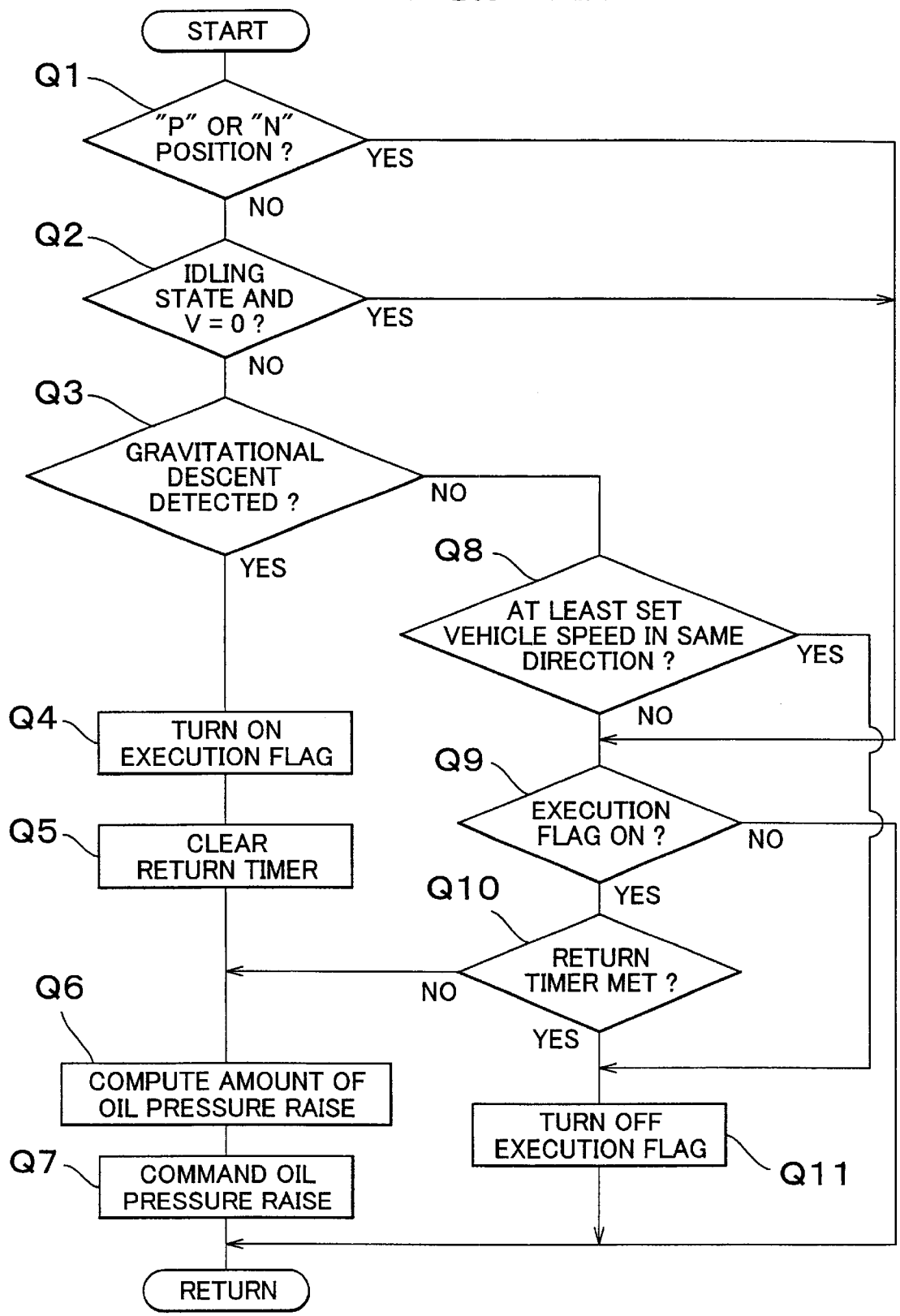
FIG. 12 is a flowchart illustrating detailed content of a signal processing executed by a gravitational pull down-time oil pressure raising device illustrated in FIG. 9.

In FIG. 12, if the determination at step Q3 is "NO" (negative), that is, if no gravitationally forced descent of the vehicle is detected, step Q8 is executed. In step Q8, it is determined whether the rotational direction of the motor rotation speed Nrm matches the operated position of the shift lever 30 and the vehicle speed V is greater than or equal to a predetermined value (e.g., about 3 to 5 km/hour). If the vehicle speed V is greater than or equal to the predetermined value, it is considered that the vehicle has completely exited the gravitationally forced descent state, and the process proceeds to step Q11, in which the execution flag is turned off. Then, the oil pressure raising correction is increased at the time of a gravitationally forced descent. If the vehicle speed V is less than the predetermined value, or if the determination at steps Q1 or Q2 is "YES", step Q9 is executed, in which it is determined whether the execution flag is on. If the execution flag is off, the process immediately ends. If the execution flag is on, as in for example, a case where a gravitationally forced descent state has just been exited, step Q10 is executed. In step Q10, it is determined whether the time measured by the return timer is cleared in step Q5, that is, the elapsed time following the exit from the gravitationally forced descent state, has exceeded a predetermined time. Until the predetermined time is exceeded, steps Q6 and Q7 are executed to continue the oil pressure correction at the time of a gravitationally forced descent. If the predetermined time is exceeded, the execution flag is turned off.

Referring back to FIG. 10, the duty ratio $D_{SLS}$ of the linear solenoid valve 110 is computed in step S8 in accordance with the target oil pressure Ptg with reference to a predetermined data map or the like. In step S9, the exciting current of the linear solenoid valve 110 is duty-controlled in accordance with the duty ratio $D_{SLS}$. Therefore, the oil pressure $P_D$ supplied to the hydraulic actuator of the secondary-side variable pulley 12b is regulated so as to reach the target oil pressure Ptg. Torque transfer is performed by clamping the transmission belt 12c at a lowest-possible belt clamping pressure without allowing the slipping of the belt in accordance with the mode of run and various states of operation.

In this embodiment, the belt clamping pressure of the transmission 12, more specifically, the target oil pressure Ptg of the oil pressure $P_D$ of the secondary-side variable pulley 12b, is set in accordance with the mode of run in steps S1 to S6. During the motor run mode (forward, reverse) in which the vehicle operates using the motor generator 16, which produces small torque fluctuations and allows high control precision, the lower limit guard of the target oil pressure Ptg is reduced in comparison with the modes of run (the locked-up run mode, the ETC run mode, etc.) involving the engine 14, which produces great torque fluctuations. The target oil pressure Ptg is further reduced at the time of a neutral state where the load on the transmission 12 is small. Therefore, while the slipping of the belt due to insufficient clamping pressure is avoided, the power transfer loss due to excessive belt clamping pressure is reduced and the energy loss of the oil pump 100 for generating high clamping pressure (oil pressure) is reduced. Thus, fuel economy improves.

Furthermore, at the time of the changing of the mode of run, the target oil pressure Ptg is raised by a predetermined amount as a correction in step S7. Therefore, the slipping of the belt due to insufficient clamping pressure is prevented, regardless of torque fluctuations at the time of startup of the engine 14, the fuel-cut or the like, or torque fluctuations at the time of engagement and release of the clutches C1, C2 and the brake B1 for changing the mode of run. That is, since the target oil pressure Ptg is reduced at times other than the time of change in the mode of run, the power transfer loss due to excessively high belt clamping pressure and the energy loss of the oil pump 100 for generating high clamping pressure (oil pressure) are reduced, and therefore, fuel economy improves. In particular, in this embodiment, the amount of oil pressure increase is determined in accordance with the type of change in the mode of run, so that it is possible to more effectively reduce the power transfer loss and the energy loss while preventing the belt from slipping.

Furthermore, if the vehicle is gravitationally descended in the direction opposite to the direction of starting the vehicle at the time of a hill climb start, the target oil pressure Ptg is raised by a predetermined amount for correction in step S7, thereby preventing an event that the belt slips due to insufficient belt clamping pressure when great torque is applied in the starting direction afterwards. That is, the target oil pressure Ptg is reduced at times other than the time of gravitationally forced descent, so that the power transfer loss and the energy loss can be reduced. In particular, in this embodiment, the amount of oil pressure raise is determined in accordance with the gravitationally drawn vehicle speed, so that it is possible to more effectively reduce the power transfer loss and the energy loss while preventing the belt from slipping.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A vehicle drive control apparatus, comprising:
    a power transfer device that has a variable transfer torque capacity;
    a plurality of drive power sources that rotate a drive wheel via the power transfer device; and
    a controller that:
        controls an operation of a vehicle in a plurality of run modes that differ in states of operation with respect to the drive power sources;
        determines a descent of the vehicle that the vehicle descends in a direction opposite to a vehicle starting direction, when a reverse run of the vehicle is detected while gears for establishing a forward run of the vehicle are engaged, or when the forward run of the vehicle is detected while gears for establishing the reverse run of vehicle are engaged; and
        increases the transfer torque capacity of the power transfer device when the descent of the vehicle is determined.

2. The vehicle drive control apparatus according to claim 1, wherein:
    the power transfer device is a continuously variable transmission that comprises: an input rotational member; an output rotational member; and a transmission member, disposed between the input rotational member and the output rotational member, and wherein the continuously variable transmission shifts a speed by continuously changing radial positions of torque transfer sites between the transmission member and the input and output rotational members with respect to rotation centers of the input and output rotational members; and
    the drive power sources include an internal combustion engine and an electric motor.

3. The vehicle drive control apparatus according to claim 2, wherein the continuously variable transmission is a belt-type continuously variable transmission that transfers a power by clamping a transmission belt in response to an oil pressure being applied, and that shifts a speed ratio by changing groove widths of a pair of variable pulleys.

4. The vehicle drive control apparatus according to claim 3, herein the transfer torque capacity is changed by changing a belt clamping force applied to the transmission belt.

5. The vehicle drive control apparatus according to claim 4, wherein the transfer torque capacity is increased by increasing the oil pressure so as to as to increase the belt clamping force applied to the transmission belt.

6. The vehicle drive control apparatus according to claim 3, wherein an amount of the transfer torque capacity is increased as the vehicle speed during the descent increases, by increasing a belt clamping force applied to the transmission belt on the basis of an oil pressure increasing map.

7. The vehicle drive control apparatus according to claim 1, wherein the descent of the vehicle is determined in accordance with a consistency between a shift position and a rotational direction of the motor rotation speed of an electric motor.

8. A drive control method for a vehicle that includes a power transfer device that has a variable transfer torque capacity, and a plurality of drive power sources that rotate a drive wheel via the power transfer device, the method comprising:
    controlling the vehicle to selectively operate in a plurality of run modes that differ in states of operation with respect to the drive power sources; and
    determining that a descent of the vehicle that the vehicle descends in a direction opposite to a vehicle starting direction, when a reverse run of the vehicle is detected while gears for establishing a forward run of the vehicle are engaged, or when the forward run of the vehicle is detected while gears for establishing the reverse run of vehicle are engaged, and
    increasing the transfer torque capacity of the power transfer device when the descent of the vehicle is determined.

9. The vehicle drive control method according to claim 8, wherein the power transfer device is a belt-type continuously transmission, and wherein the transfer torque capacity is increased by increasing a belt clamping force applied to a transmission belt.

10. The drive control method according to claim 9, wherein an amount of the transfer torque capacity is increased as the vehicle speed during the descent increases, by increasing a belt clamping force applied to the transmission on the basis of an oil pressure increasing map.

11. A vehicle drive control apparatus, comprising:

a power transfer device that has a variable transfer torque capacity;

a plurality of drive power sources that rotate a drive wheel via the power transfer device;

control means for controlling an operation of a vehicle in a plurality of run modes that differ in states of operation with respect to the drive power sources; and torque capacity changing means for determining a descent of the vehicle that the vehicle descends in a direction opposite to a vehicle starting direction, when a reverse run of the vehicle is detected while gears for establishing a forward run of the vehicle are engaged, or when the forward run of the vehicle is detected while gears for establishing the reverse run of vehicle are engaged, and for increasing the transfer torque capacity of the power transfer device when the descent of the vehicle is determined.

* * * * *